US012709218B2

(12) United States Patent
Park et al.

(10) Patent No.: US 12,709,218 B2
(45) Date of Patent: Aug. 18, 2026

(54) SYSTEM AND METHOD FOR AUTOMATICALLY ACTIVATING A TURN SIGNAL OF A VEHICLE

(71) Applicant: GM Global Technology Operations LLC, Detroit, MI (US)

(72) Inventors: Minwoo Park, Bupyeong-gu (KR); Rakyung Gwak, Seoul (KR); Bongbum Back, Incheon (KR); Hyoungsuk Kim, Seoul (KR); Daniel Pinheiro Carlesimo, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 18/778,220

(22) Filed: Jul. 19, 2024

(65) Prior Publication Data

US 2026/0021761 A1 Jan. 22, 2026

(51) Int. Cl.

| | |
|---|---|
| ***B60Q 1/34*** | (2006.01) |
| ***G06F 3/01*** | (2006.01) |
| ***G06T 7/70*** | (2017.01) |
| ***H05B 47/115*** | (2020.01) |

(52) U.S. Cl.

CPC ............. *B60Q 1/346* (2013.01); *G06F 3/012* (2013.01); *G06F 3/013* (2013.01); *G06T 7/70* (2017.01); *H05B 47/115* (2020.01); *G06T 2207/30201* (2013.01); *G06T 2207/30268* (2013.01)

(58) Field of Classification Search

CPC .... H05B 47/115; H05B 47/125; B60Q 1/346; B60Q 1/525; G06F 3/012; G06F 3/013; G06T 7/70; G06T 2207/30201; G06T 2207/30268

See application file for complete search history.

(56) References Cited

U.S. PATENT DOCUMENTS

| | | | | |
|---|---|---|---|---|
| 11,685,307 | B2 * | 6/2023 | Paul | B62D 1/046 340/465 |
| 12,377,776 | B2 * | 8/2025 | Pendleton | B60Q 1/346 |
| 2016/0001781 | A1 * | 1/2016 | Fung | G06V 10/82 701/36 |
| 2019/0077308 | A1 * | 3/2019 | Kashchenko | B60Q 1/346 |
| 2019/0318181 | A1 * | 10/2019 | Katz | B60W 40/09 |
| 2019/0339786 | A1 * | 11/2019 | Takeuchi | G06F 3/012 |
| 2025/0319772 | A1 * | 10/2025 | Yoshizaki | B60R 1/26 |

FOREIGN PATENT DOCUMENTS

| | | |
|---|---|---|
| DE | 102017206605 A1 | 10/2018 |

* cited by examiner

*Primary Examiner* — Tung X Le

(74) *Attorney, Agent, or Firm* — Vivacqua Crane, PLLC

(57) ABSTRACT

A method for automatically activating a turn signal includes monitoring a vehicle occupant of a vehicle with a driver monitoring system. The driver monitoring system includes at least one camera and is configured to determine a position of at least one eye of the vehicle occupant, a head direction of the vehicle occupant, and a shoulder movement. The method includes detecting that a gaze of the vehicle occupant is directed toward a side view mirror of a vehicle or detecting that a shoulder movement of the vehicle occupant, and in response, automatically activating the turn signal of the vehicle.

10 Claims, 2 Drawing Sheets

SYSTEM AND METHOD FOR AUTOMATICALLY ACTIVATING A TURN SIGNAL OF A VEHICLE

INTRODUCTION

The present disclosure generally relates to system and methods for automatically activating a turn signal of a vehicle.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicle drivers don't always activate the turn signal when switching lanes. It therefore desirable to develop a system and method that automatically activates the turn signal when the vehicle operator is switching lanes.

SUMMARY

The present disclosure describes a method for automatically activating a turn signal of a vehicle. The method also includes monitoring a vehicle occupant of a vehicle with a driver monitoring system. The driver monitoring system includes at least one camera and is configured to determine a position of at least one eye of the vehicle occupant, a head direction of the vehicle occupant, and a shoulder movement. The method further includes detecting that a gaze of the vehicle occupant is directed toward a side view mirror of a vehicle. The method further includes automatically activating the turn signal of the vehicle in response to determining that the gaze of the vehicle occupant is directed toward the side view mirror of the vehicle. The method described in this paragraph improves vehicle technology by automating the turn signal activation.

In an aspect of the present disclosure, the method may include monitoring the movement of a steering wheel of the vehicle. The method may include monitoring a steering wheel angle of the steering wheel of the vehicle. The method may include determining that the steering wheel angle is greater than a predetermined angle threshold. The turn signal of the vehicle is automatically turned on in response to: (a) detecting that the gaze of the vehicle occupant is directed toward the side view mirror and/or the rearview mirror of the vehicle, and (b) determining that the steering wheel angle is greater than the predetermined angle threshold. The method may include determining that a steering angle movement with respect to time is greater than a predetermined rate threshold. The turn signal of the vehicle is automatically turned on in response to: (a) detecting that the gaze of the vehicle occupant is directed toward the side view mirror of the vehicle, and (b) determining that the steering angle movement with respect to time is greater than the predetermined rate threshold. The method may include monitoring a head pose of the vehicle occupant. The method may include determining that the head pose of the vehicle occupant indicates that the vehicle occupant is gazing toward the side view mirror. The turn signal of the vehicle is automatically turned on in response to: (a) detecting that the gaze of the vehicle occupant is directed toward the side view mirror of the vehicle, and (b) determining that the head pose of the vehicle occupant indicates that the vehicle occupant is gazing toward the side view mirror.

In another aspect of the present disclosure, method for automatically activating a turn signal includes monitoring a vehicle occupant of a vehicle with a camera and detecting a shoulder movement (i.e., a shoulder check) of the vehicle occupant. The movement may be referred to as a shoulder check. A shoulder check is a quick turn of the head, either left or right, to look out your side window. Shoulder checking (sometimes called a head check) is an important way to see what's in your blind spots. The method also includes determining that the shoulder movement is indicative that the vehicle occupant is looking toward an adjacent lane and, automatically activating the turn signal of the vehicle in response to determining that the shoulder movement is indicative that the vehicle occupant is looking toward an adjacent lane. The method described in this paragraph improves vehicle technology by automating the turn signal activation.

In an aspect of the present disclosure, the method may include monitoring a movement of a steering wheel of the vehicle. The method may include monitoring a steering wheel angle of the steering wheel of the vehicle. The method may include determining that the steering wheel angle is greater than a predetermined angle threshold. The turn signal of the vehicle is automatically turned on in response to: (a) determining that the shoulder movement is indicative that the vehicle occupant is looking toward an adjacent lane, and (b) determining that the steering wheel angle is greater than the predetermined angle threshold. The method may include determining that a steering angle movement with respect to time is greater than a predetermined rate threshold. The turn signal of the vehicle is automatically turned on in response to: (a) determining that the shoulder movement is indicative that the vehicle occupant is looking toward an adjacent lane, and (b) determining that the steering angle movement with respect to time is greater than the predetermined rate threshold.

A system for automatically activating a turn signal including a camera positioned to monitor a vehicle occupant and a controller in communication with the camera. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figures 1, 2:
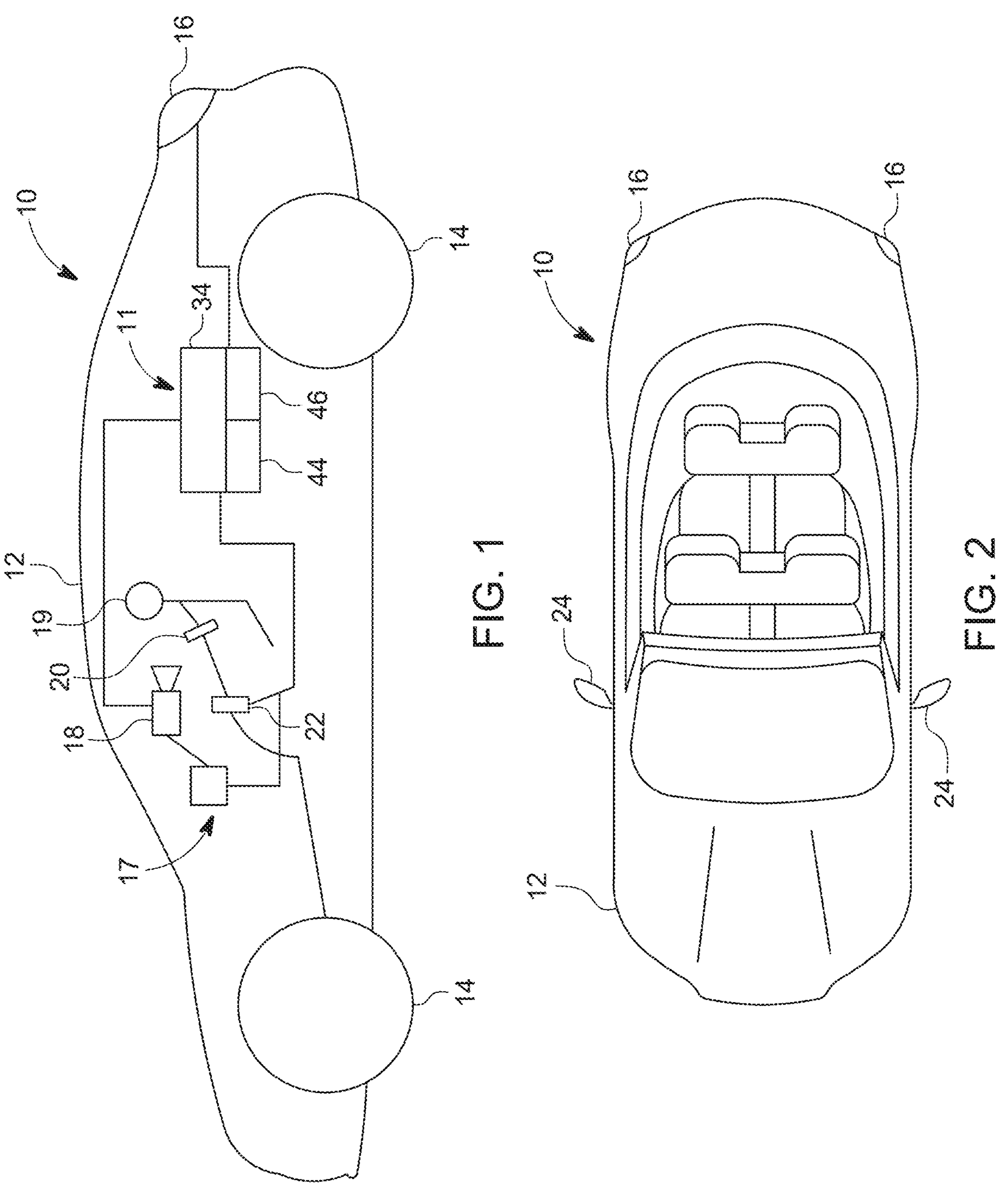
FIG. 1 is a schematic side view of a vehicle including a system for automatically activating a turn signal.
FIG. 2 is a schematic top view of a vehicle traveling along a road.

Reference will now be made in detail to several examples of the disclosure that are illustrated in accompanying drawings. Whenever possible, the same or similar reference numerals are used in the drawings and the description to refer to the same or like parts or steps.

With reference to FIGS. 1 and 2, a vehicle 10 generally includes a vehicle body 12 and a plurality of wheels 14 coupled to the vehicle body 12. The vehicle 10 may be an autonomous vehicle. The vehicle 10 may be a sedan, a truck, a coupe, a sport utility vehicle (SUV), a recreational vehicles (RV). The vehicle 10 further includes a system 11 for automatically turning one or more turn signals 16. The turn signals 16 may be lights and are coupled to the vehicle body 12. The vehicle 10 further includes a driver monitoring system (DMS) 17. The DMS 17 includes one or more cameras 18 positioned to monitor a vehicle occupant 19 (e.g., the vehicle driver). The DMS 17 includes infrared (IR) cameras, RGB cameras, and time-of-flight cameras. The IR cameras are primarily used for tracking the driver's eyes and facial recognition. IR cameras function well in low-light conditions, making them effective for monitoring during nighttime driving. RGB cameras are standard color cameras used to detect the driver's facial expressions and movements. RGB cameras can recognize brightness and colors, helping to assess the driver's emotional state. Time-of-flight cameras measure distance to create 3D images, allowing for more precise detection of the driver's position and movements. Time-of-flight cameras are beneficial for tracking motion and analyzing posture. The IR cameras, RGB cameras, and time-of-flight cameras are used for real-time monitoring of the driver's attention, fatigue, and emotional state, thereby supporting safer driving. The camera 18 may be directly coupled to the vehicle body 12. The vehicle 10 further includes side view mirrors 24 (FIG. 2).

Further, the system 11 includes a controller 34 in communication with the camera 18. While the controller 34 is shown coupled to the vehicle 10, it is contemplated that the controller 34 may be external to the vehicle 10. The controller 34 is programmed to receive the raw image from the camera 18 and includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the turn signal 16. The controller 34 is in communication with the DMS 17, the camera 18, and the turn signals 16.

The instructions may include one or more separate programs, each of which comprises an ordered listing of executable instructions for implementing logical functions. The instructions, when executed by the processor 44, receive and process signals from the camera 18, perform logic, calculations, methods and/or algorithms for automatically controlling the components of the turn signals 16, and generate control signals based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. The non-transitory computer readable storage device or media 46 includes machine-readable instructions (shown, for example, in FIG. 3), that when executed by the one or more processors, cause the processors 44 to execute the method 100 (FIG. 3).

The vehicle 10 further includes a steering wheel 20 and a steering angle sensor (SAS) 22 coupled to the steering wheel 20. The steering wheel 20 may be rotated to control the steering of the vehicle 10. The SAS 22 is configured to directly or indirectly measure, in real time, the steering wheel angle and/or the steering wheel angle speed, among other signals. The wheel angle may be measured by the Engine Control Unit and transmitted to the controller 34. The controller 34 is in communication with the SAS 22.

Figure 3:
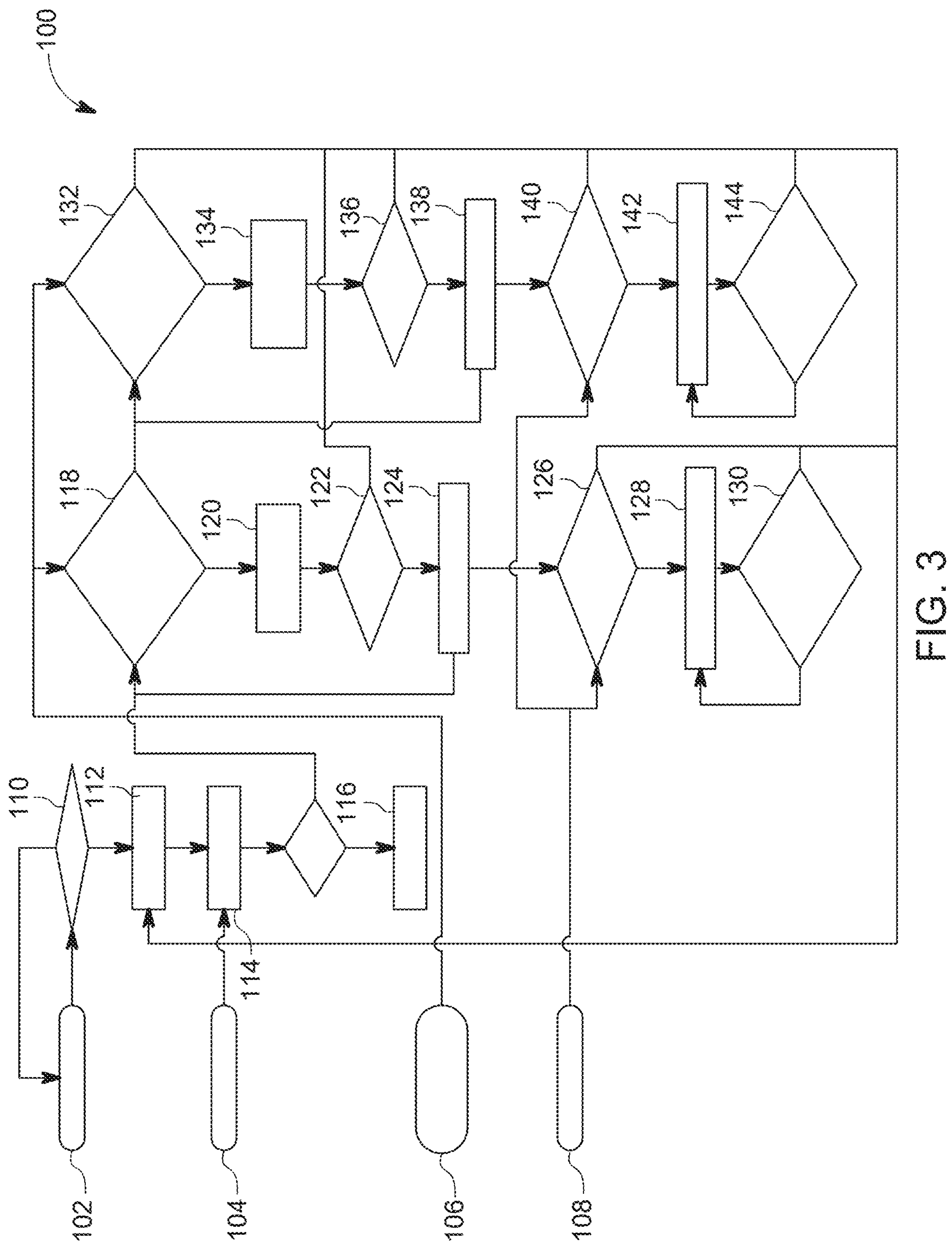
FIG. 3 is a flowchart of a method for automatically activating a turn signal of the vehicle of FIG. 1.

FIG. 3 is a flowchart of a method for automatically activating the turn signal 16 of the vehicle 10. The method 100 begins at blocks 102, 104, 106, and 108, where the controller 34 receives several inputs. At block 102, the controller 34 receives the transmission state (e.g., parking, drive, reverse, neutral, drive, or low). At block 104, the controller 34 receives inputs from relevant vehicle interfaces. At block 106, the controller 34 receives image data from the camera 18 of the DMS 17. At block 108, the controller 34 receives sensor data from the SAS 22. The sensor data generated by the SAS 22 is indicative of the steering angle movement with respect to time and/or the steering angle.

The method 100 then continues to block 110. At block 110, the controller 34 determines whether the transmission status is in Drive or Low. If the transmission status is not in Drive or Low, then the method 100 returns to block 102. If the transmission status is in Drive or Low, then the method 100 continues to block 112.

At block 112, the system 11 for automatically turning one or more turn signals 16 is initiated. The system 11 may be referred to as the smart turn signal system. Then, the method 100 proceeds to block 114. At block 114, the controller 34 performs a system interfaces diagnosis of the relevant vehicle interfaces inputs. Then, the method 100 proceeds to block 116. At block 116, the controller 34 determines whether system 11 passed the system interfaces diagnosis. If it did not, then the method 100 continues to block 116. At block 116, the controller 34 disables the system 11. If the system 11 passed all the system interface diagnosis, then the method 100 proceeds to block 118.

At block 118, the controller 34 uses the image data from the camera 18 to determine to monitor the eye gaze and/or head pose of the vehicle occupant 19. Further, the controller 34 may determine, using the image data, whether the eye gaze, head pose, and/or shoulder movement of the vehicle occupant 19 is directed toward the right-side view mirror 24 of the vehicle 10. To do so, the controller 34 determines whether head rotation, the eye gaze, and/or shoulder movement of the vehicle occupant 19 is greater than a right-side threshold. If the head pose and/or the eye gaze is not greater than the right-side threshold, then the method 100 proceeds to block 132. If the head pose and/or the eye gaze is greater than the right-side threshold, then the method 100 proceeds to block 120. As a non-limiting example, the right-side threshold may be thirty degrees. However, it is envisioned that the right-side threshold may be adjusted based on other system variables (e.g., vehicle speed) or based on the output of the neural network or another type of machine learning technique.

At block 120, the controller 34 registers the time elapsed until the condition at block 118 is no longer true. Then, the method 100 continues to block 122.

At block 122, the controller 34 determines whether the elapsed time (determined in block 120) is greater than a time threshold. If the elapsed time is not greater than the time threshold, then the method 100 proceeds to block 102. If the elapsed time is greater than the time threshold, then the method 100 continues to block 124.

At block 124, the controller 34 determines the condition has occurred (i.e., the vehicle occupant 19 is trying to change lanes). In one embodiment, more than one consecutive occurrence is required to proceed. The occurrence may be calibrated or may be based on the vehicle occupants learned habits using, for example, a neural network. For example, the controller 34 may track the eye gaze toward an inside rearview mirror instead of (or in addition to) a side view mirror 24. The neural networks may also determine how many times the occupants gaze at the side view mirror 24 and/or the rearview mirror. Further, the neural network may determine whether the occupants perform a shoulder check before changing lane. Then, the method 100 continues to block 126.

At block 126, the controller 34 determines whether the steering wheel angle is greater than the predetermined angle threshold and/or whether steering angle movement with respect to time (i.e., steering wheel speed) is greater than a predetermined rate threshold. If the steering wheel angle is not greater than the predetermined angle threshold and/or whether steering angle movement with respect to time (i.e., steering wheel speed) is not greater than a predetermined rate threshold, then the method 100 returns to block 102. If the steering wheel angle is greater than the predetermined angle threshold and/or whether steering angle movement with respect to time (i.e., steering wheel speed) is greater than a predetermined rate threshold, then the method 100 proceeds to block 128. At block 128, the right turn signal 16 is automatically turned on. When the turn signal 16 is activated, the system 11 will provide the vehicle 10 with a unique serial data signal to differentiate the automatic activation from driver-initiated turn signal activation. The unique serial data signal is consumed by other subfunctions, like Lane Departure Warning and/or Lane Deep Assist, which allows the system 11 to seamlessly integrate with other active safety features. Then, the method 100 continues to block 130. At block 130, the controller 34 determines whether the steering wheel angle is greater than the predetermined angle threshold and/or whether steering angle movement with respect to time (i.e., steering wheel speed) is greater than a predetermined rate threshold and the transmissions status is either Drive or Low. If the steering wheel angle is not greater than the predetermined angle threshold and/or whether the steering angle movement with respect to time (i.e., steering wheel speed) is not greater than a predetermined rate threshold and the transmissions status is not Drive or Low, then the method 100 returns to block 102. If the steering wheel angle is greater than the predetermined angle threshold and/or whether the steering angle movement with respect to time (i.e., steering wheel speed) is greater than a predetermined rate threshold and the transmissions status is Drive or Low, then the method 100 returns to block 128.

The method 100 further includes block 132 for left-face rotation and/or eye gaze detection. At block 132, the controller 34 uses the image data from the camera 18 to determine to monitor the eye gaze and/or head pose of the vehicle occupant 19. The controller 34 can also recognize how many times (counts) the vehicle occupant gazes left side view mirror 16, right side view mirror 16, and/or rearview mirror. Further, the controller 34 may determine, using the image data, whether the eye gaze, head pose, and/or shoulder movement of the vehicle occupant 19 is directed toward the left-side view mirror 24 of the vehicle 10. To do so, the controller 34 determines whether head rotation, the eye gaze, and/or shoulder movement of the vehicle occupant 19 is greater than a left-side threshold. If the head pose and/or the eye gaze is not greater than the right-side threshold, then the method 100 proceeds to block 102 If the head pose and/or the eye gaze is greater than the right-side threshold, then the method 100 proceeds to block 134. As a non-limiting example, the left-side threshold may be thirty degrees. However, it is envisioned that the left-side threshold may be adjusted based on other system variables (e.g., vehicle speed) or based on the output of the neural network or another type of machine learning technique.

At block 134, the controller 34 registers the time elapsed until the condition at block 132 is no longer true. Then, the method 100 continues to block 136.

At block 136, the controller 34 determines whether the elapsed time (determined in block 134) is greater than a time threshold. If the elapsed time is not greater than the time threshold, then the method 100 proceeds to block 102. If the elapsed time is greater than the time threshold, then the method 100 continues to block 138.

At block 138, the controller 34 determines the condition has occurred (i.e., the vehicle occupant 19 is trying to change lanes). In one embodiments, more than one consecutive is required to proceed. The occurrence may be calibrated or may be based on the vehicle occupants learned habits using, for example, a neural network. For example, the controller 34 may track the eye gaze toward an inside rearview mirror instead of (or in addition to) a side view mirror 24. Then, the method 100 continues to block 140.

At block 140, the controller 34 determines whether the steering wheel angle is greater than the predetermined angle threshold and/or whether steering angle movement with respect to time (i.e., steering wheel speed) is greater than a predetermined rate threshold. If the steering wheel angle is not greater than the predetermined angle threshold and/or whether steering angle movement with respect to time (i.e., steering wheel speed) is not greater than a predetermined rate threshold, then the method 100 returns to block 102. If the steering wheel angle is greater than the predetermined angle threshold and/or whether steering angle movement with respect to time (i.e., steering wheel speed) is greater than a predetermined rate threshold, then the method 100 proceeds to block 142. At block 142, the left turn signal 16 is automatically turned on. When the turn signal 16 is activated, the system 11 will provide the vehicle 10 with a unique serial data signal to differentiate the automatic activation from driver-initiated turn signal activation. The unique serial data signal is consumed by other subfunctions, like Lane Departure Warning and/or Lane Deep Assist, which allows the system 11 to seamlessly integrate with other active safety features. Then, the method 100 continues to block 144. At block 144, the controller 34 determines whether the steering wheel angle is greater than the predetermined angle threshold and/or whether steering angle movement with respect to time (i.e., steering wheel speed) is greater than a predetermined rate threshold and the transmissions status is either Drive or Low. If the steering wheel angle is not greater than the predetermined angle threshold and/or whether the steering angle movement with respect to time (i.e., steering wheel speed) is not greater than a predetermined rate threshold and the transmissions status is not Drive or Low, then the method 100 returns to block 102. If the steering wheel angle is greater than the predetermined angle threshold and/or whether the steering angle movement with respect to time (i.e., steering wheel speed) is greater than a predetermined rate threshold and the transmissions status is Drive or Low, then the method 100 returns to block 142.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for automatically activating a turn signal, comprising:

monitoring a vehicle occupant of a vehicle with a driver monitoring system, wherein the driver monitoring system includes at least one camera and is configured to determine a position of at least one eye of the vehicle occupant, a head direction of the vehicle occupant, and a shoulder movement of the vehicle occupant;

monitoring a movement of a steering wheel of the vehicle;

determining that a steering angle movement with respect to time is greater than a predetermined rate threshold;

detecting, using the driver monitoring system, that an eye gaze of the vehicle occupant, a head rotation, and the shoulder movement are directed toward a side view mirror of the vehicle;

determining that the eye gaze, the head rotation, and the shoulder movement are each greater than a movement threshold, wherein the movement threshold is a function of a speed of the vehicle; and in response to determining that the eye gaze of the vehicle occupant, the head rotation, and the shoulder movement are greater than the movement threshold, and determining that the steering angle movement with respect to time is greater than the predetermined rate threshold, automatically activating the turn signal of the vehicle.

2. The method of claim 1, further comprising monitoring a steering wheel angle of the steering wheel of the vehicle.

3. The method of claim 2, further comprising determining that the steering wheel angle is greater than a predetermined angle threshold.

4. The method of claim 3, wherein the turn signal of the vehicle is automatically turned on in response to additionally determining that the steering wheel angle is greater than the predetermined angle threshold.

5. The method of claim 1, further comprising:

determining that a transmission of the vehicle is in Drive or Low; and wherein the turn signal of the vehicle is automatically turned on in response to additionally determining that the transmission is in Drive or Low.

6. The method of claim 1, further comprising:

providing the vehicle a unique serial data signal to differentiate the automatic activation of the turn signal from a driver-initiated turn signal activation, and sending the unique serial data signal to a Lane Departure Warning subfunction to integrate with other active safety features in the vehicle.

7. A system automatically activating a turn signal in a vehicle, the system comprising:

a steering wheel in the vehicle;

a side view mirror attached to the vehicle;

a camera positioned to monitor a vehicle occupant;

a controller in communication with the camera, wherein the controller is programmed to:

monitor the vehicle occupant to determine a position of at least one eye of the vehicle occupant, a head direction of the vehicle occupant, and a shoulder movement of the vehicle occupant;

monitor a movement of the steering wheel of the vehicle;

determine that a steering angle movement with respect to time is greater than a predetermined rate threshold;

detect, using the camera, that an eye gaze of the vehicle occupant, a head rotation, and the shoulder movement are directed toward the side view mirror;

determine that the eye gaze, the head rotation, and the shoulder movement are each greater than a movement threshold, wherein the movement threshold is a function of a speed of the vehicle; and in response to determining that the eye gaze of the vehicle occupant, the head rotation, and the shoulder movement are greater than the movement threshold, and determining that the steering angle movement with respect to time is greater than the predetermined rate threshold, automatically activate the turn signal of the vehicle.

8. The system of claim 7, wherein the controller is programmed to monitor the movement of the steering wheel of the vehicle, and to automatically activate the turn signal in response to additionally determining that the movement of the steering wheel is greater than a predetermined angle threshold.

9. The system of claim 7, wherein the controller is further programmed to:

determine that a transmission of the vehicle is in Drive or Low; and automatically activate the turn signal in response to additionally determining that the transmission is in Drive or Low.

10. The system of claim 7, wherein the controller is further programmed to:

provide the vehicle a unique serial data signal to differentiate the automatic activation of the turn signal from a driver-initiated turn signal activation, and send the unique serial data signal to a Lane Departure Warning subfunction to integrate with other active safety features in the vehicle.

* * * * *